April 3, 1956 G. E. CHANIOT 2,740,586
AUTOMATIC PRESSURE AND TEMPERATURE RELIEF VALVE
Filed Aug. 24, 1953 2 Sheets-Sheet 1
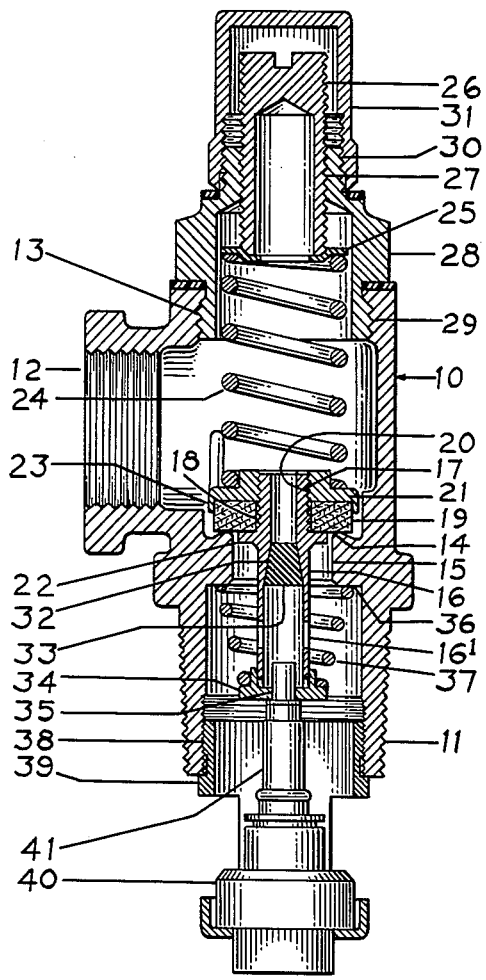
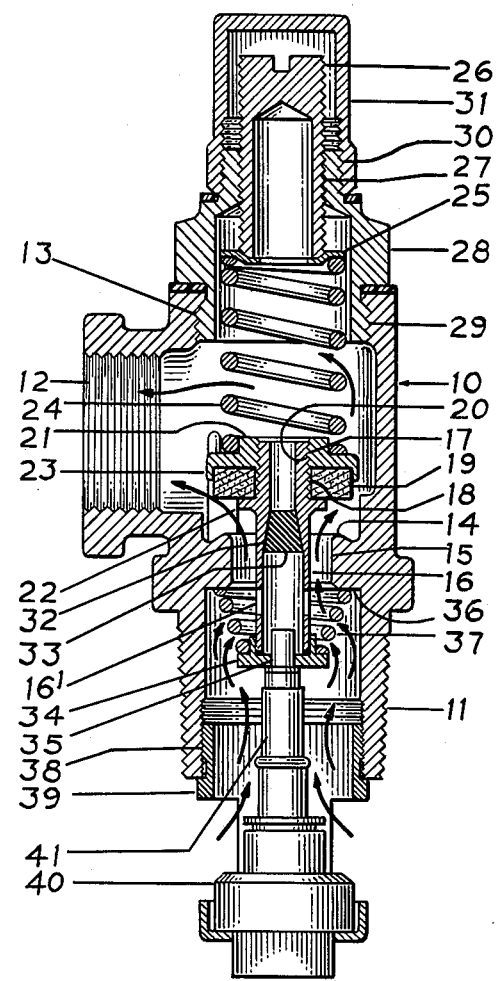
GEORGE E. CHANIOT
INVENTOR.
BY *G. Lorenzo Miller*
ATTORNEY April 3, 1956  G. E. CHANIOT  2,740,586
AUTOMATIC PRESSURE AND TEMPERATURE RELIEF VALVE
Filed Aug. 24, 1953  2 Sheets-Sheet 2
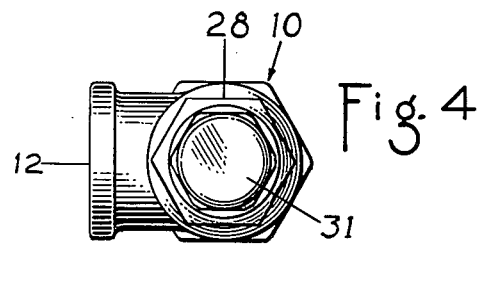
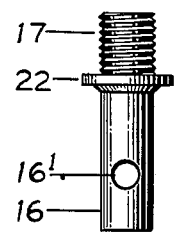
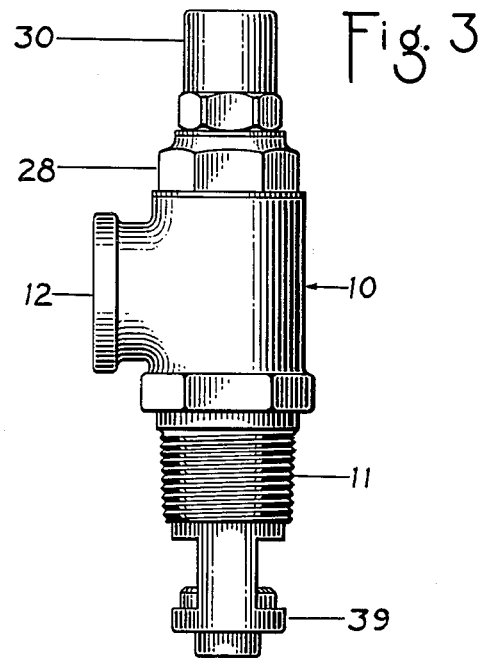
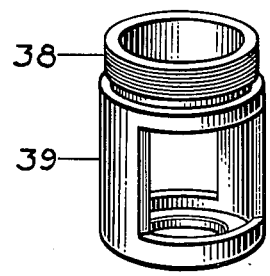
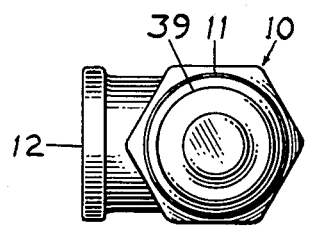
GEORGE E. CHANIOT
INVENTOR.
BY *G. Lorenz Miller*
ATTORNEY

United States Patent Office 2,740,586
Patented Apr. 3, 1956

2,740,586

AUTOMATIC PRESSURE AND TEMPERATURE RELIEF VALVE

George E. Chaniot, Decatur, Ill., assignor to A. W. Cash Valve Manufacturing Corporation, Decatur, Ill.

Application August 24, 1953, Serial No. 376,075

6 Claims. (Cl. 236—92)

This invention relates to an automatic pressure and temperature relief valve.

Domestic type automatic hot water storage heaters now in use are provided with an operating thermostat which controls the maximum temperature of the water in the heater tank. When the water temperature reaches a predetermined point between 120° F. and 180° F. as determined by adjustment of the thermostat by the home owner, the water heating medium is turned off. If water is used from the storage tank, it is correspondingly replaced by cold water with a resulting drop of temperature of the water in the tank and as a result of which the thermostat causes the heating medium to be turned on.

This thermostat is an automatic operating mechanism which seldom fails in its purpose of maintaining a substantially uniform predetermined temperature of the water in the tank in accordance with the setting or adjustment of the thermostat.

However, a very small percentage of such thermostats do fail and which have in many instances caused serious damage. This small percentage of failure of the tank operating thermostats led to the provision of relief valves in the hot water storage tanks which permit bleeding thereof under conditions which may be excessively high pressure, dangerously high temperature or both.

It is a primary object of this invention to provide a pressure and temperature relief valve for use in hot water supply tank installations and which embodies audio signal means for warning occupants that the valve is operating under excessive heat conditions.

A further object of the invention is to provide a relief valve of the above noted general character which is relatively simple in construction, efficient and dependable in use and which is capable of manufacture at relatively low cost.

Other objects and advantages of the invention will become apparent in the course of the following detailed description, taken in connection with the accompanying drawings, wherein—

Fig. 1 is an enlarged axial sectional view of the improved relief valve showing the cooperating elements in inactive position.

Fig. 2 is a view similar to Fig. 1 showing certain elements of the valve in operative position as a result of abnormal heat of the water in a tank with which the valve may be operatively connected.

Fig. 3 is an actual size elevational view of the valve.

Fig. 4 is a top plan view of the valve.

Fig. 5 is a bottom plan view of the valve.

Fig. 6 is an enlarged elevational view of a seat stem embodied in the valve structure.

Fig. 7 is an enlarged perspective view of a Vernatherm cage embodied in the valve structure.

Referring now in detail to the drawings, 10 designates a cylindrical valve body which is provided at one end thereof with an axial externally threaded extension 11 for threaded connection with a hot water storage tank or with a hot water outlet pipe at a point closely adjacent the tank. The body 10 is further provided with an internally threaded extension 12 for receiving an end of a water discharge pipe. The body 10 is further provided with a threaded opening 13 at its opposite end and also with a fixed seat 14 surrounding a plain walled opening 15 which is disposed intermediate the threaded extensions 11 and 12.

A tubular stem 16 of substantially less diameter than that of opening 15 is disposed axially within the opening for limited axial movement and said stem has one end portion thereof threaded as at 17 which extends through a central opening 18 in a composition seat 19 and which threaded end portion is engaged within a threaded opening 20 with which a seat shell 21 is provided.

The tubular stem 16 is provided with a radial flange 22 which is engaged by said composition seat 19 and which seat normally engages the fixed body seat 14. The seat shell 21 bears against the side of the composition seat 19 opposed to the side thereof which is engaged with the flange 22 and the seat shell 21 is provided with a marginal flange 23 which engages over the said composition seat.

The composition seat 19 is normally maintained in engagement with the fixed seat 14 by means of a pressure spring 24, one end of which engages the seat shell 21 and the opposite end of which engages a washer 25 which in turn engages one end of a pressure adjusting screw 26 which has threaded engagement as at 27 with a body cap 28.

The body cap at one end thereof has threaded connection as at 29 with the valve body 10 while the opposite end of the cap is threaded as at 30 for releasable engagement therewith of a threaded pressure screw enclosing cap 31.

The tubular stem 16 is provided with an axial bore of different diameters at the opposite ends thereof and the wall of said bore includes an outwardly converging portion 32 in which is disposed a correspondingly shaped fusible plug 33. The stem is provided with apertures 16¹ which open into the larger chamber bore.

A cap 34 having a central aperture 35 is disposed over the lower end of the stem 16 and between which and a shoulder 36 within the body 10 is disposed a temperature coil spring 37 which is of frusto-conical form in elevation and whose larger end engages the shoulder 36.

The above referred to body extension 11 is of tubular form and houses the temperature spring 37 as well as a portion of the stem 16. The free end of the extension 11 is internally threaded for removable reception of an externally threaded portion 38 of a Vernatherm cage 39 in which is supported a Vernatherm thermostat 40 which is provided with a stem 41 in co-axial relation to stem 16 and whose reduced free end is disposed within the above referred to aperture 35.

In the use of the improved structure as above described, the valve is operatively connected either directly to a hot water storage tank or to the hot water outlet pipe closely adjacent the tank by turning the threaded extension 11 into a suitably tapped opening in the tank or hot water pipe. A suitable water discharge pipe may be connected to the threaded extension 12.

With the improved valve thus assembled, the pressure adjusting screw 27 is set for a predetermined maximum pressure and the thermostat 40 is set for a predetermined maximum water temperature.

In the said assembled position of the valve, the thermostat 40 is disposed within the tank water and in approximately the hottest region thereof and the interior of the valve housing 10 is open to the interior of the tank.

Upon the occurrence of a water pressure exceeding that of the setting of screw 27, the composition seat 19 will be lifted from the fixed body seat 14 to permit water to escape through the pipe connected with the extension 12.

Upon this pressure lifting of the seat 19 the stem 16 will move axially of the reduced end portion of the thermostat stem 41.

Upon the occurrence of water temperature exceeding that of the setting of the thermostat 40, the stem 41 will be elevated as in Fig. 2 with a resulting elevation of the stem 16 and the composition seat 19 together with a compression of the temperature spring 37.

With the parts in this position water will flow between the relatively closely spaced convolutions of the spring, through the opening 15, through the space between the thus separated fixed and composition seats 14 and 19 and out through the extension 12.

In this relief position of parts, the flow of water between the closely spaced convolutions of the temperature spring as indicated by arrows in Fig. 2 will cause vibration of the spring which results in an audible signal for warning an occupant that the regular thermostat control is not properly functioning.

To a certain extent the pressure feature of the valve will be an operating mechanism in that, if the valve is installed on what is called a closed plumbing system, where it is impossible for water under pressure to expand into the mains, the valve will be called upon to operate quite frequently.

The temperature feature of the valve, however, is not an operating mechanism. When installed on the usual type of domestic hot water supply systems, the valve will in the main serve as an emergency safety device to keep the temperature of the water in the tank below steaming conditions.

The automatic thermostat in the hot water tank will normally be the operating mechanism that controls the temperature.

The temperature feature of the relief valve will only function should the automatic thermostat fail. If the thermostat does fail and the automatic temperature feature of the relief valve is called upon to act, it is of importance that the home owner be advised of such action and such advisement is provided by the audible signal feature above described.

Should the composition seat 19 stick to the fixed seat 14 or should the temperature relief mechanism fail for any reason, hot water will enter apertures $16^1$ and will fuse the plug 33 and thereby allow water to pass through the bore in stem 16 and out through extension 12.

Having set forth my invention in accordance with a preferred structural embodiment thereof, what I claim and desire to secure by United States Letters Patent is:

1. A temperature relief valve for a hot water storage tank, comprising a body member having an open interior and provided with water inlet and outlet connections, said inlet connection communicating with said outlet connection through an opening surrounded by a fixed valve seat at one end thereof and a shoulder at the other end thereof, a movable seat normally engaging said fixed seat, stem means extending axially within said inlet connection and said opening and having one end thereof connected to said movable seat, a thermostat supported by said inlet connection and operatively engaged with said stem means, and a temperature coil spring disposed within said inlet connection and having one end thereof engaged with said shoulder and the other end engaged with said stem means, whereby upon the occurrence of a water temperature exceeding that of a setting of the thermostat the said stem means will move the movable seat away from the fixed seat with a resulting compression of said spring for passage of hot water through the relatively closely spaced convolutions of the spring with a resulting vibration thereof and an audible signal produced thereby.

2. The structure according to claim 1, wherein said stem means comprises a tubular stem member having one end thereof connected to said movable seat, the said tubular stem member further being provided with water admission apertures in the wall thereof, and the opposite end of said tubular stem member being open, a centrally apertured cap engaged with the open end of said tubular stem member, and said stem means further comprising a stem member projecting from the thermostat and having a reduced end portion received in the aperture in said cap.

3. The structure according to claim 2, together with a fusible plug disposed within said tubular stem member.

4. An automatic pressure and temperature relief valve comprising a hollow body member having right angularly disposed water inlet and outlet hollow extensions at opposite ends thereof, said body member being provided with an opening intermediate said extensions surrounded by a fixed valve seat at the outlet extension end thereof and a shoulder at the other end of the opening and the inner end of said inlet extension, a movable valve seat co-operating with said fixed valve seat, an adjustable coil spring in said body member having one end thereof bearing on said movable valve seat for normally holding same in contact with said fixed valve seat, a tubular stem having one end thereof fixed to said movable valve seat and extending therefrom axially within said opening and said inlet connection in spaced relation to the walls thereof, a centrally apertured cap loosely engaged with the other end of said tubular stem, a coil spring in said inlet extension having its opposite ends engaged with said shoulder and said cap, and a thermostat supported by said inlet extension and having a stem loosely engaged with said cap.

5. The structure according to claim 4, wherein said tubular stem is provided with water admission openings in the wall thereof, and a fusible plug disposed within the tubular stem.

6. The structure according to claim 4 wherein upon the occurrence of a water temperature exceeding that of a setting of the thermostat, an audible signal is produced, by water passing through the coil spring in the inlet extension on the way to the valve opening.

References Cited in the file of this patent

UNITED STATES PATENTS

| 2,031,558 | Clifford | Feb. 18, 1936 |
| 2,035,512 | Smith | Mar. 31, 1936 |
| 2,112,665 | Dube | Mar. 29, 1938 |
| 2,598,351 | Carter | May 27, 1952 |